(12) United States Patent
Kadam et al.

(10) Patent No.: US 11,975,671 B1
(45) Date of Patent: May 7, 2024

(54) VEHICLE AIRBAG ASSEMBLY

(71) Applicant: Ford Global Technologies, LLC, Dearborn, MI (US)

(72) Inventors: Mangesh Kadam, Canton, MI (US); Murugan Sundaram Ramasamy, Canton, MI (US); Srinivas Reddy Malapati, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/308,068

(22) Filed: Apr. 27, 2023

(51) Int. Cl.
  *B60R 21/207* (2006.01)
  *B60R 21/233* (2006.01)
  *B60R 21/2338* (2011.01)
  *B60R 21/231* (2011.01)

(52) U.S. Cl.
  CPC .......... *B60R 21/207* (2013.01); *B60R 21/233* (2013.01); *B60R 21/2338* (2013.01); *B60R 2021/23107* (2013.01); *B60R 2021/23388* (2013.01)

(58) Field of Classification Search
  CPC . B60R 21/207; B60R 21/233; B60R 21/2338; B60R 2021/23107; B60R 2021/23388
  See application file for complete search history.

(56) References Cited

U.S. PATENT DOCUMENTS

| | | | |
|---|---|---|---|
| 4,508,294 A | 4/1985 | Lorch | |
| 6,315,245 B1* | 11/2001 | Ruff | B64D 25/02 244/122 AG |
| 9,238,425 B2* | 1/2016 | Fukawatase | B60R 21/013 |
| 9,744,932 B1 | 8/2017 | Faruque et al. | |
| 10,471,920 B2* | 11/2019 | Dry | B60R 21/2165 |
| 10,513,206 B2 | 12/2019 | Spahn et al. | |
| 10,518,733 B2* | 12/2019 | Dry | B60R 21/01554 |
| 10,703,324 B2 | 7/2020 | Hill et al. | |
| 10,710,539 B2* | 7/2020 | Cho | B60R 21/207 |
| 10,906,500 B2 | 2/2021 | Kanegae et al. | |
| 11,052,861 B2* | 7/2021 | Park | B60R 21/233 |
| 11,186,245 B2* | 11/2021 | Kadam | B60R 21/207 |
| 11,491,948 B2 | 11/2022 | Jaradi et al. | |
| 2014/0042733 A1* | 2/2014 | Fukawatase | B60R 21/0136 280/730.2 |
| 2019/0275979 A1* | 9/2019 | Dry | B60R 21/207 |
| 2020/0391690 A1* | 12/2020 | Faruque | B60R 21/233 |
| 2021/0001799 A1* | 1/2021 | Sandinge | B60R 21/231 |

FOREIGN PATENT DOCUMENTS

| | | | | |
|---|---|---|---|---|
| DE | 2008030380 A1 | | 1/2009 | |
| DE | 102018121147 A1 | * | 3/2019 | ............... B60N 2/14 |
| FR | 2667831 B1 | | 4/1992 | |
| JP | 2013159220 A | * | 8/2013 | |

* cited by examiner

*Primary Examiner* — Faye M Fleming
(74) *Attorney, Agent, or Firm* — Frank A. MacKenzie; Bejin Bieneman PLC

(57) ABSTRACT

A seat assembly includes a seatback and an airbag supported by the seatback. The airbag is inflatable from an uninflated position to an inflated position. The seat assembly includes a bar pivotally supported by the seatback and fixed to the airbag. The bar is pivotable about a vertical axis of the seat assembly from a stowed position at the seatback with the airbag at the uninflated position to a deployed position forward of the seatback with the airbag at the inflated position.

20 Claims, 7 Drawing Sheets

VEHICLE AIRBAG ASSEMBLY

BACKGROUND

A vehicle may include one or more airbags deployable during certain vehicle impacts to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
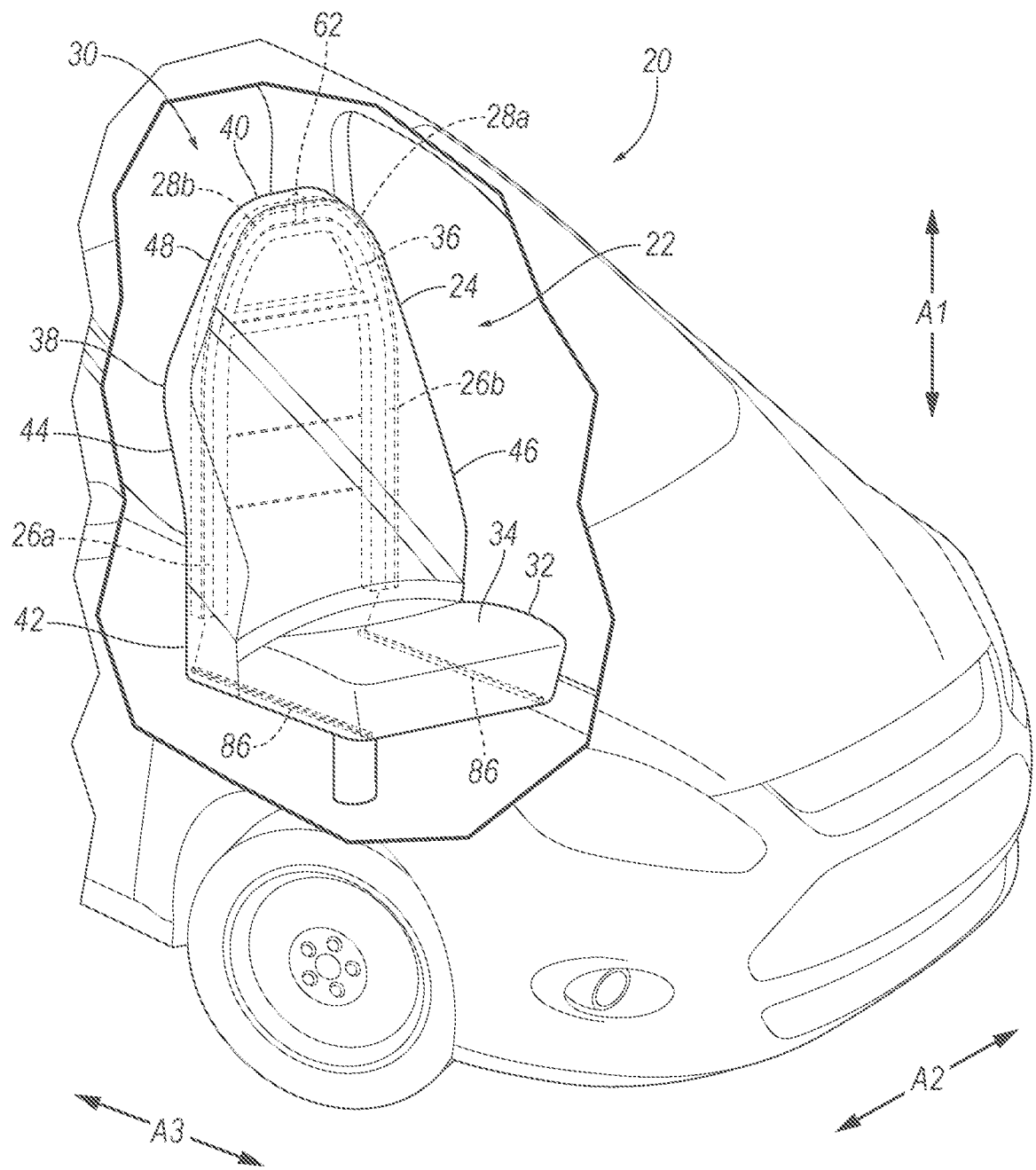
FIG. 1 is a perspective view a vehicle with a seat with an airbag assembly.

A seat assembly includes a seatback. The seat assembly includes an airbag supported by the seatback and inflatable from an uninflated position to an inflated position. The seat assembly includes a bar pivotally supported by the seatback and fixed to the airbag, the bar pivotable about a vertical axis of the seat assembly from a stowed position at the seatback with the airbag at the uninflated position to a deployed position forward of the seatback with the airbag at the inflated position.

The airbag in the inflated position may include a front distal edge and the bar at the deployed position may be elongated along the front distal edge.

The airbag in the inflated position may include an inflation tube that extends forward of the seat back toward the bar at the deployed position.

The airbag in the inflated position may include a first inflation chamber above the inflation tube and a second inflation chamber below the inflation tube.

The inflation tube may be in fluid communication with the first inflation chamber and the second inflation chamber.

The airbag in the inflated position may include a second inflation tube below the second inflation chamber and a third inflation chamber below the second inflation tube, the second inflation tube extending forward of the seat back toward the bar at the deployed position and in fluid communication with second inflation chamber and the third inflation chamber.

The seat assembly may include a seat bottom supporting the seat back and a tether fixed to the airbag, the tether slidably engaged with the seat bottom and slidable from a first position with the airbag at the uninflated position along the seat bottom away from the seat back to a second position with the airbag at the inflated position.

The seat assembly may include a shuttle fixed to the tether and supported by the seat bottom, the shuttle and the tether slidable along the seat bottom from the first position to the second position.

The tether may be fixed to a distal end of the bar.

The seat bottom may include a top surface and the airbag in the inflated position nay extend below the top surface of the seat bottom.

The seat assembly may include a plurality of ribs elongated vertically along the airbag in the inflated position, the ribs spaced from each other, the seat back, and the bar at the deployed position.

The ribs may be stiffer than the airbag.

The seatback may include a cover, and the bar at the stowed position may be internal of the cover and the bar at the deployed position is external of the cover.

The airbag may be supported at a first side of the seatback, and the seat assembly may include a second airbag supported by the seatback at a second side of the seatback laterally spaced from the first side, the second airbag inflatable from an uninflated position to an inflated position, and my include a second bar supported by the seatback and fixed to the second airbag, the second bar pivotable about the vertical axis from a stowed position at the seatback with the second airbag at the uninflated position to a deployed position forward of the seatback with the second airbag at the inflated position.

The seat assembly may include a tether that extends from a first distal end to a second distal end, the first distal end releasably fixed to the second distal end, the first distal end and the second distal end supported at a top of the seatback with the airbag in the uninflated position, the first distal end and the second distal end forward of the seatback with the airbag in the inflated position.

A seat assembly includes a seatback. The seat assembly includes a first airbag supported by the seatback and inflatable from an uninflated position to an inflated position, the first airbag in the uninflated position at a first side of the seatback and in the inflated position extending forward of the seatback to a first distal edge of the first airbag. The seat assembly includes a second airbag supported by the seatback and inflatable from an uninflated position to an inflated position, the second airbag in the uninflated position at a second side of the seatback laterally spaced from the first side and in the inflated position forward of the seatback to a second distal edge of the second airbag. The seat assembly includes a tether supported by the seatback, the tether extending from a first distal end of the tether to a second distal end of the tether, the first distal end releasably fixed to the second distal end, the first distal end and the second distal end supported at a top of the seatback with the first airbag and the second airbag in the uninflated positions, the first distal end and the second distal end forward of the seatback at the first distal edge and the second distal edge with the first airbag and the second airbag in the inflated positions.

The seatback may include a seatback frame, and the tether may extend from behind the seatback frame to forward of the seatback with the first airbag and the second airbag in the inflated positions.

The seat assembly may include a second tether supported by the seatback, the second tether extending from a first distal end of the second tether to a second distal end of the second tether, the first distal end of the second tether releasably fixed to the second distal end of the second tether and supported at the top of the seatback with the first airbag and the second airbag in the uninflated positions and forward of the seatback below the first distal end of the tether and the second distal end of the tether at the first distal edge and the second distal edge with the first airbag and the second airbag in the inflated positions.

The seat assembly may include a bar supported by the seatback and fixed to the first airbag, the bar pivotable about a vertical axis of the seat assembly from a stowed position at the seatback with the first airbag at the uninflated position to a deployed position forward of the seatback with the first airbag at the inflated position.

The seat assembly may include a seat bottom supporting the seat back and a second tether fixed to the first airbag, the second tether slidably engaged with the seat bottom and slidable from a first position with the first airbag at the uninflated position along the seat bottom away from the seat back to a second position with the second airbag at the inflated position.

With reference to the Figures, wherein like numerals indicate like parts throughout the several views, a vehicle 20 having a seat assembly 22 is shown. The seat assembly 22 includes a seatback 24 and an airbag 26a, 26b supported by the seatback 24. The airbag 26a, 26b is inflatable from an uninflated position to an inflated position. The seat assembly 22 includes a bar 28a, 28b supported by the seatback 24 and fixed to the airbag 26a, 26b. The bar 28a, 28b is pivotable about a vertical axis A1 of the seat assembly 22 from a stowed position at the seatback 24 with the airbag 26a, 26b at the uninflated position to a deployed position forward of the seatback 24 with the airbag 26a, 26b at the inflated position. The bar 28a, 28b pivoting about the vertical axis A1 may control kinematics of the airbag 26a, 26b, e.g., during inflation of the airbag 26a, 26b and/or at the inflated position. The airbag 26a, 26b at the inflated position may control kinematics of an occupant of the seat assembly 22, e.g., during certain impacts to the vehicle 20.

With reference to FIG. 1, the vehicle 20 may be any suitable type of automobile, e.g., a passenger or commercial automobile such as a sedan, a coupe, a truck, a sport utility vehicle, a crossover vehicle, a van, a minivan, a taxi, a bus, etc.

The vehicle 20 may define a passenger cabin 30 to house occupants, if any, of the vehicle 20. The passenger cabin 30 may extend across the vehicle 20, e.g., from a left side of the vehicle 20 to a right side of the vehicle 20. The passenger cabin 30 includes a front end and a rear end with the front end being in front of the rear end during forward movement of the vehicle 20.

One or more seat assemblies 22 may be supported in the passenger cabin 30, e.g., by a floor of the vehicle 20. The seat assemblies 22 may be rotatably supported by the floor to rotate and face, e.g., the front end the rear end, the right side, the left side, etc. The seat assemblies 22 may be supported via a pivot assembly or other suitable structure that allows rotation of the seat assembly 22, including conventional structures. Each seat assembly 22 includes the seatback 24 and a seat bottom 32 that can support an occupant of the seat assembly 22. For example, the occupant of the seat assembly 22 may sit atop a top surface 34 of the seat bottom 32 and recline against the seatback 24.

Figure 3:
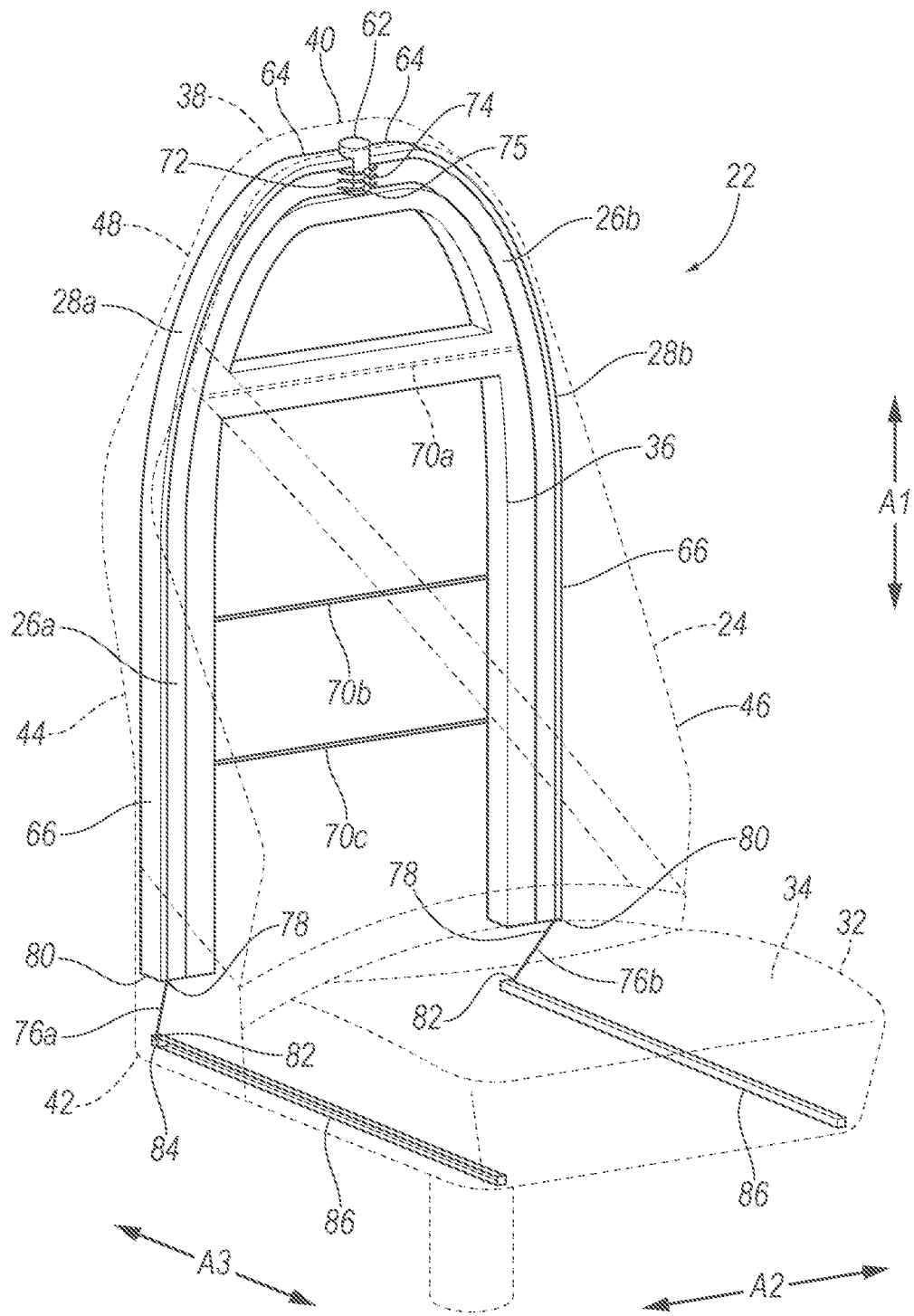
FIG. 3 is a front-side perspective diagrammatic view of the seat and the airbag assembly.
Figure 4:
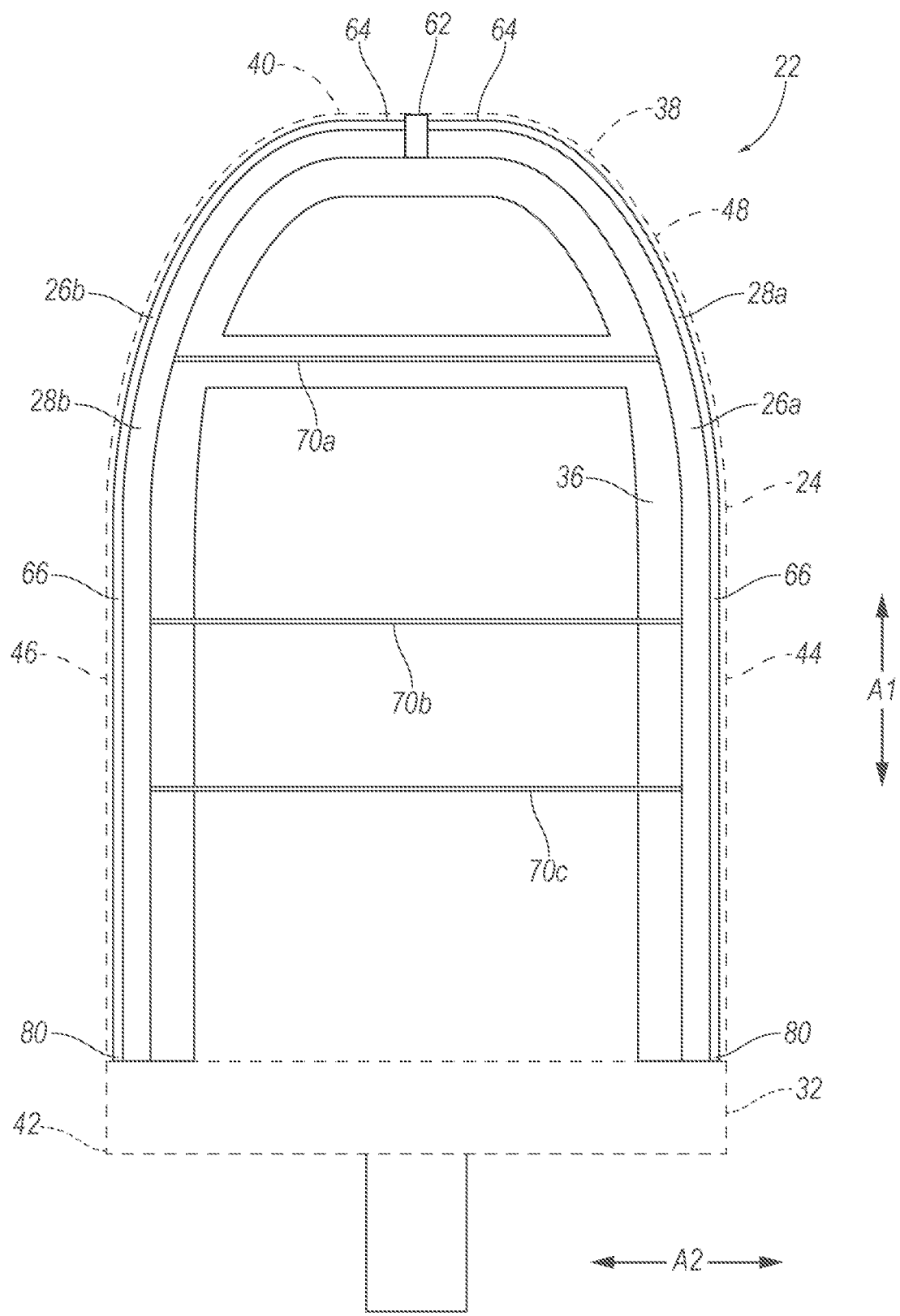
FIG. 4 is a rear diagrammatic view of the seat and the airbag assembly.

With reference to FIGS. 1, 3 and 4, the seatback 24 may include a seatback frame 36 and a cover 38 supported on the seatback frame 36. The seatback frame 36 may include tubes, beams, etc. Specifically, the seatback frame 36 may include a pair of upright frame members. The upright frame members are elongated, and specifically, are elongated in a generally upright direction (e.g., along the vertical axis A1) when the seatback 24 is in a generally upright position. The upright frame members are spaced from each other along a lateral axis A2. The seatback frame 36 may include one or more cross-members extending between the upright frame members. The seatback frame 36, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame 36 may be formed of a suitable metal, e.g., steel, aluminum, etc. The cover 38 may include upholstery and padding. The upholstery may be cloth, leather, faux leather, or any other suitable material. The upholstery may be stitched in panels around the frame. The padding may be between the cover 38 and the seatback frame 36 and may be foam or any other suitable material.

The seatback 24 has a top end 40 and a bottom end 42. The bottom end 42 is at, e.g., abuts, the seat bottom 32. The top end 40 is spaced from, e.g., distal to, the seat bottom 32. In other words, the top end 40 and the bottom end 42 are opposite ends, with the top end 40 above the bottom end 42 along the vertical axis A1. The seatback 24 includes a first side 44 and a second side 46 spaced from each other along the lateral axis A2. The lateral axis A2 is perpendicular to the vertical axis A1. For example, the first side 44 may be at a right of the occupant seated in the seat assembly 22, and the second side 46 may be at a left of the occupant.

The seatback 24 is supported by the seat bottom 32 at the bottom end 42 of the seatback 24, e.g., via the seatback frame 36. The seat bottom 32 extends forward from the seatback 24 relative to the seat assembly 22. The seatback 24 may be stationary or movable relative to the seat bottom 32. The seatback 24 and the seat bottom 32 may be adjustable in multiple degrees of freedom. Specifically, the seatback 24 and the seat bottom 32 may themselves be adjustable, in other words, adjustable components within the seatback 24 and/or the seat bottom 32, and/or may be adjustable relative to each other.

The seat assembly 22 may include a headrest 48. The headrest 48 may control kinematics of the head of the occupant of the seat assembly 22. The headrest 48 proximate the top end 40 of the seatback 24. The headrest 48 may be below the top end 40. The headrest 48 may be stationary or movable relative to the seatback 24. The seatback 24 and the headrest 48 may be adjustable in multiple degrees of freedom. Specifically, the seatback 24 and/or the headrest 48 may themselves be adjustable and/or may be adjustable relative to each other.

Figure 2:
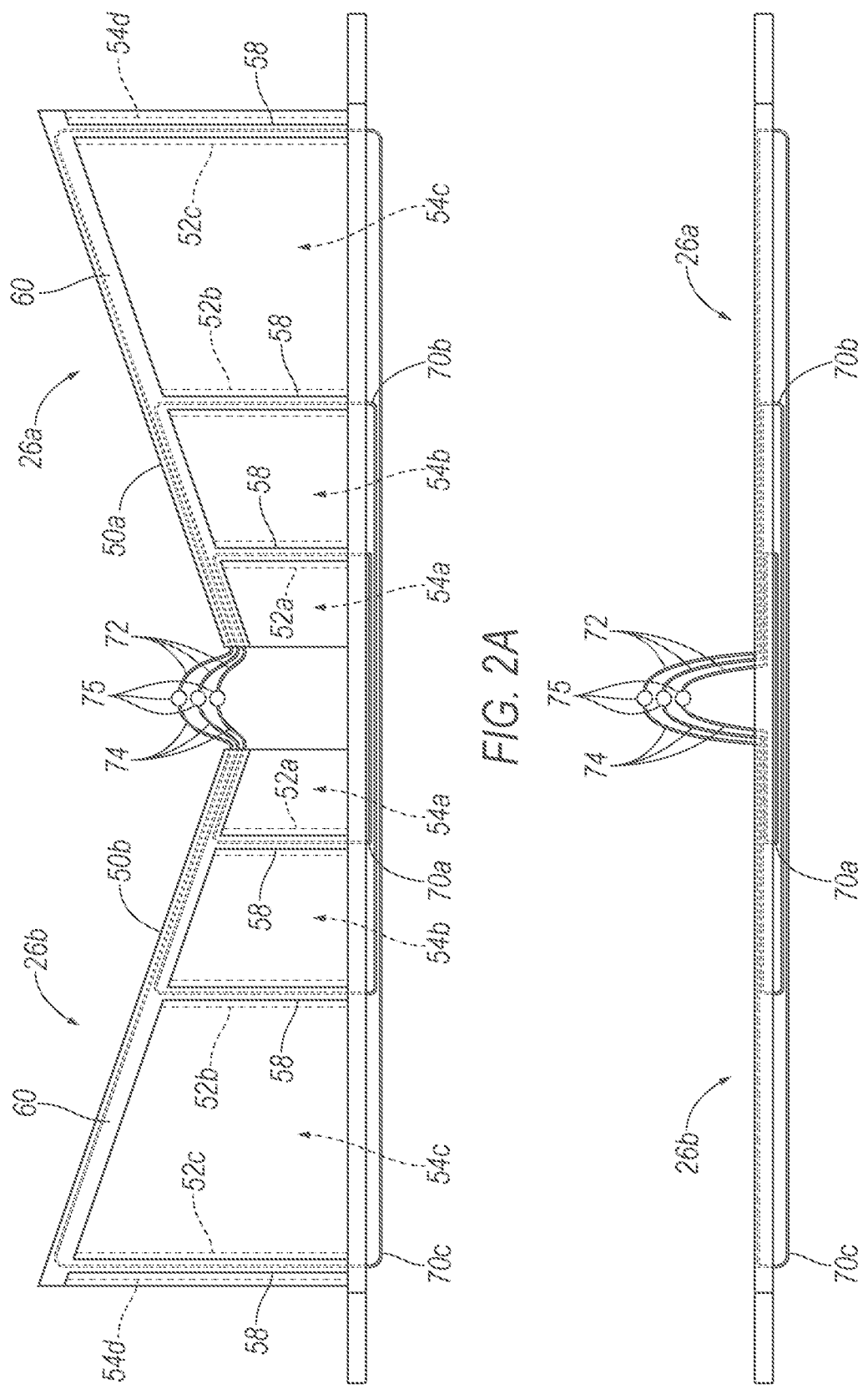
FIG. 2a is a top view of an airbag of the airbag assembly before it is folded for installation.
FIG. 2b is a top view of the airbag folded for installation.

The seat assembly 22 includes one or more airbags 26a, 26b, e.g., a first airbag 26a supported by the seatback 24 at the first side 44 and a second airbag 26b supported by the seatback 24 at the second side 46 of the seatback 24 laterally spaced from the first side 44. The airbags 26a, 26b laid flat prior to installation on the seatback 24 is shown in FIG. 2A. The airbags 26a, 26b of FIG. 2A may be folded for installation to the seatback 24 at uninflated positions, shown in FIG. 2B. With reference to FIGS. 3 and 4, the first airbag 26a in the uninflated position may extend from the top end 40 downward along the first side 44. The second airbag 26b in the uninflated position may extend from the top end 40 downward along the second side 46. The airbags 26a, 26b in the uninflated positions may be internal of the cover 38, i.e., not visible to an occupant of the seat assembly 22. The airbags 26a, 26b may be supported by the seatback frame 36 via respective airbag 26a, 26b housings (not shown). The airbags 26a, 26b are inflatable from the uninflated positions to inflated positions, shown in FIG. 6. The housings may provide reaction surfaces for the airbags 26a, 26b in the inflated positions. Each airbag 26a, 26b may include panels of a woven polymer or any other material. As one example, the airbags 26a, 26b may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. The housings may be any material, e.g., a rigid polymer, a metal, a composite, etc.

Figure 6:
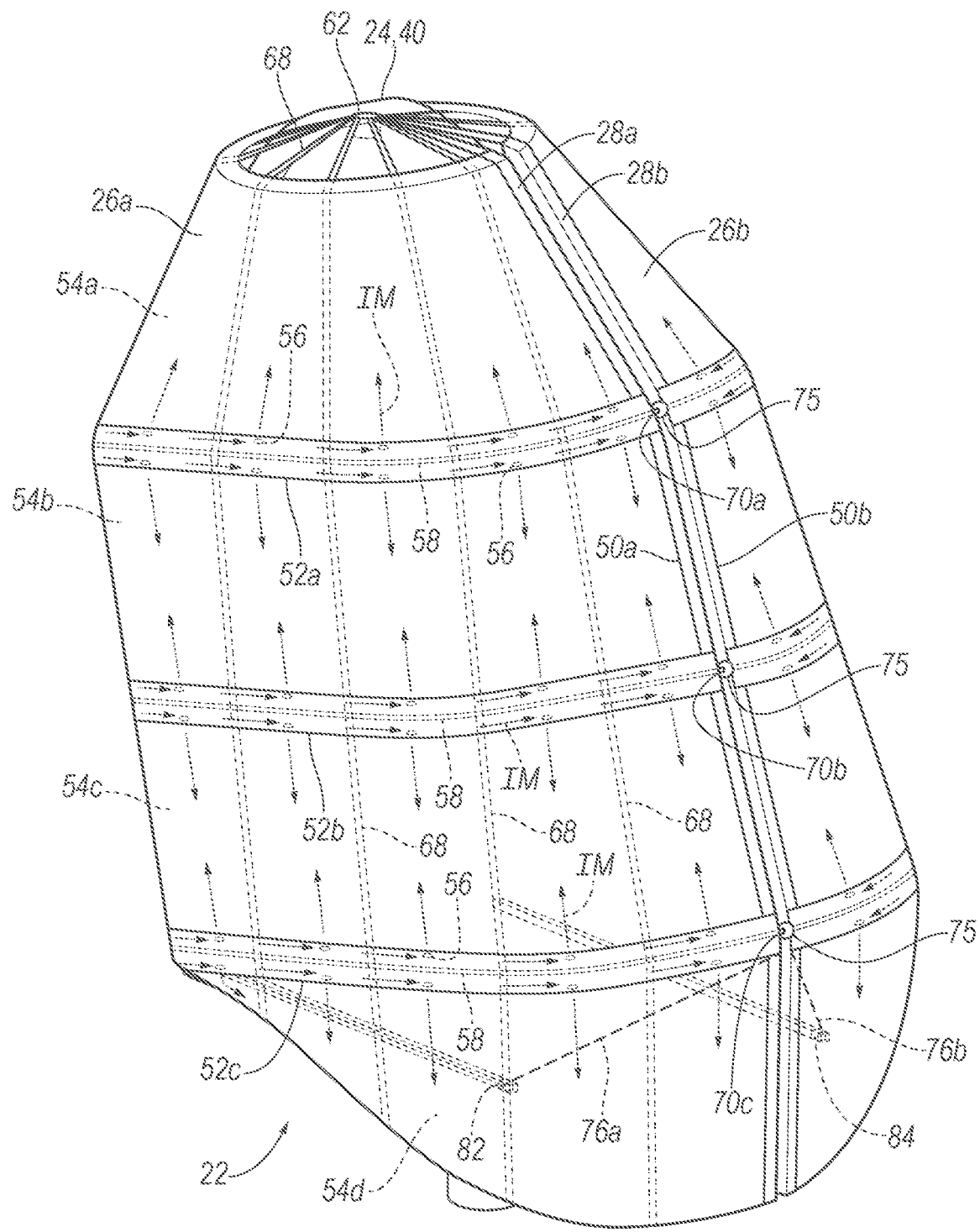
FIG. 6 is a front-side perspective diagrammatic view of the seat and the airbag assembly inflated to the inflated position.

With respect to FIG. 6, the airbags 26a, 26b in the inflated positions are shown. The airbags 26a, 26b in the inflated position may collectively enclose the occupant of the seat assembly 22. The airbags 26a, 26b in the inflated positions extend forward from the seatback 24 to front distal edges 50a, 50b. For example, the first airbag 26a in the inflated position may extend from the first side 44 of the seatback 24 forward to a first front distal edge 50a, and the second airbag 26b may extend from the second side 46 of the seatback 24 forward to a second front distal edge 50b. The front distal edges 50a, 50b of the airbags 26a, 26b may be elongated along the vertical axis A1 and spaced from the seatback 24 along a longitudinal axis A3 of the seat assembly 22. The front distal edges 50a, 50b may about each other. The occupant of the seat assembly 22 may be positioned between the seatback 24 and the front distal edges 50a, 50b. The airbags 26a, 26b in the inflated positions may extend below the top surface 34 of the seat bottom 32, e.g., to control kinematics of legs of the occupant of the seat assembly 22 during certain impacts to the vehicle 20.

The airbags 26a, 26b in the inflated positions may each include one or more inflation tubes 52a, 52b, 52c and one or more inflation chambers 54a, 54b, 54c, 54d. The inflation tubes 52a, 52b, 52c and the inflation chambers 54a, 54b, 54c, 54d may be defined by one or more panels of the airbags 26a, 26b, e.g., enclosed between inner and outer panels. Inflation medium IM may be received by the inflation tubes 52a, 52b, 52c and the inflation chambers 54a, 54b, 54c, 54d to inflate the airbags 26a, 26b. The inflation tubes 52a, 52b, 52c and the inflation chambers 54a, 54b, 54c, 54d may extend from the seatback 24 to the front distal edges 50a, 50b of the airbags 26a, 26b. The inflation chambers 54a, 54b, 54c, 54d may be taller than the inflation tubes 52a, 52b, 52c along the vertical axis A1 of the seatback 24. The inflation tubes 52a, 52b, 52c and the inflation chambers 54a, 54b, 54c, 54d may be in alternating arrangement. For example, a first inflation chamber 54a may be at a top of the airbag 26a, 26b above a first inflation tube 52a. A second inflation chamber 54b may be below the first inflation tube 52a and above a second inflation tube 52b. A third inflation chamber 54c may be below the second inflation tube 52b and above a third inflation tube 52c. A fourth inflation chamber 54d may be below the third inflation tube 52c. The inflation tubes 52a, 52b, 52c are in fluid communication with the inflation chambers 54a, 54b, 54c, 54d, i.e., such that inflation medium IM can flow from the inflation tubes 52a, 52b, 52c to the inflation chambers 54a, 54b, 54c, 54d. For example, the first inflation tube 52a may include a plurality of openings 56 open to the first inflation chamber 54a and the second inflation chamber 54b. As another example, the second inflation tube 52b may include a plurality of openings 56 open to the second inflation chamber 54b and the third inflation chamber 54c. As yet another example, the third inflation tube 52c may include a plurality of openings 56 open to the third inflation chamber 54c and the fourth inflation chamber 54d.

The airbags 26a, 26b may include one or more sleeves 58, 60, e.g., fixed to outer panels of the airbags 26a, 26b. The sleeves 58, 60 may include longitudinal sleeves 58 elongated from the seatback 24 toward the front distal edges 50a, 50b (e.g., along the inflation tubes 52a, 52b, 52c) and vertical sleeves 60 elongated along the front distal edges 50a, 50b. The vertical sleeves 60 may include tear seams or the like. The sleeves 58, 60 may be open ended, i.e., having ends that are open to permit access to inside the sleeves 58, 60. One open end of the longitudinal sleeves 58 may be proximate the seatback 24 and the other open end may be proximate the front distal edges 50a, 50b of the airbags 26a, 26b. The longitudinal sleeves 58 may open into the vertical sleeves 560. The vertical sleeves 60 may have open ends at the tops of the airbags 26a, 26b.

The seat assembly 22 includes one or more bars 28a, 28b that may guide inflation of the airbags 26a, 26b and control kinematics of the airbags 26a, 26b in the inflated positions. For example, a first bar 28a may guide inflation of the first airbag 26a and a second bar 28b may guide inflation of the second airbag 26b. The bars 28a, 28b are supported by the seatback 24, e.g., at the top end 40. The bars 28a, 28b are pivotable about the vertical axis A1 from stowed positions at the seatback 24 to deployed positions forward of the seatback 24. For example, the bars 28a, 28b may be supported by the seatback frame 36 via a pivot assembly 62, e.g., including a bearing, bushing, or any other suitable structure. The bars 28a, 28b may each include a radial portion 64 that extends away from the seatback 24 and a main portion 66 that extends downward from the radial portion 64. The bars 28a, 28b are stiffer than the airbag 26a, 26b. The bars 28a, 28b may be plastic, metal, fiberglass, or any suitable material. The bars 28a, 28b may be tubular, solid, round, rectangular, etc., in cross section. The bars 28a, 28b may be flexible, such that the bars 28a, 28b flex outward when moved from the stowed positions to the deployed positions. The bars 28a, 28b may be fixed to the airbags 26a, 26b, e.g., the first bar 28a to the first airbag 26a and the second bar 28b to the second airbag 26b. The bars 28a, 28b maybe fixed to the airbags 26a, 26b, e.g., via straps, stitching, or any other suitable structure. The main portions 66 of the bars 28a, 28b may be fixed to the front distal edges 50a, 50b of the airbags 26a, 26b.

With reference to FIGS. 3 and 4, the bars 28a, 28b at the stowed positions are shown. The bars 28a, 28b are at the stowed position when the airbags 26a, 26b are at the uninflated positions. In the stowed positions, the bars 28a, 28b are at the seatback 24. For example, the main portion 66 of the first bar 28a may be at, and elongated along, the first side 44 of the seatback 24, and the main portion 66 of the second bar 28b may be at, and elongated along, the second side 46 of the seatback 24. The bars 28a, 28b at the stowed positions are internal of the cover 38 of the seatback 24. For example, the bars 28a, 28b at the stowed positions may be between the cover 38 and seatback frame 36. In the stowed positions, the bars 28a, 28b are at the seatback 24. For example, the main portion 66 of the first bar 28a may be at, and elongated along, the first side 44 of the seatback 24, and the main portion 66 of the second bar 28b may be at, and elongated along, the second side 46 of the seatback 24.

With reference to FIG. 6, the bars 28a, 28b at the deployed positions are shown. The bars 28a, 28b are at the deployed positions when the airbags 26a, 26b are at the inflated positions. Inflation of the airbags 26a, 26b may move the bars 28a, 28b to the deployed positions. For example, inflation of the first airbag 26a may move the first bar 28a from the stowed position to the deployed position, and inflation of the second airbag 26b may move the second bar 28b from the stowed position to the deployed position.

The cover 38 may tear or otherwise separate, e.g., along a tear seam or the like, to permit inflation of the airbags 26a, 26b to the inflated positions and movement of the bars 28a, 28b to the deployed positions. The bars 28a, 28b at the deployed position are external of the cover 38.

The bars 28a, 28b at the deployed positions are forward of the seatback 24. For example, the main portion 66s of the bars 28a, 28b may be forward of and spaced from the seatback 24 along the longitudinal axis A3. The occupant of the seat assembly 22 may be between the seatback 24 and the main portion 66s of the bars 28a, 28b. The bars 28a, 28b at the deployed positions may be elongated along the front distal edges 50a, 50b. For example, the main portion 66 of the first bar 28a may be elongated along the first front distal edge 50a, and the main portion 66 of the second bar 28b may be elongated along the second front distal edge 50b. The inflation tubes 52a, 52b, 52c may extend forward from the seatback 24 toward the bars 28a, 28b at the deployed positions. For example, the first inflation tube 52a, the second inflation tube 52b, and the third inflation tube 52c of the first airbag 26a may extend forward from the first side 44 of the seatback 24 to the first bar 28a. As another example, the first inflation tube 52a, the second inflation tube 52b, and the third inflation tube 52c of the second airbag 26b may extend forward from the second side 46 of the seatback 24 to the second bar 28b.

The seat assembly 22 may include a plurality of ribs 68 that support and control kinematics of the airbags 26a, 26b in the inflated positions. The ribs 68 are stiffer than the airbag 26a, 26b. The ribs 68 may be plastic, metal, fiberglass, or other suitable material. The ribs 68 may be fixed to the airbags 26a, 26b, e.g., to the inner panels or the outer panels and via straps, stitching, or any suitable structure. The ribs 68 are elongated vertically along the airbags 26a, 26b in the inflated position, e.g., generally parallel to the vertical axis A1. The ribs 68 may extend downward from the first inflation chamber 54a to the fourth inflation chamber 54d, e.g., across the inflation tubes 52a, 52b, 52c and other inflation chambers 54b, 54c. The ribs 68 are spaced from each other, the seatback 24, and the bars 28a, 28b at the deployed positions. For example, the ribs 68 may be generally evenly spaced along the first airbag 26a between the seatback 24 and the main portion 66 of the first bar 28a and the ribs 68 may be generally evenly spaced along the second airbag 26b between the seatback 24 and the main portion 66 of the second bar 28b.

With respect to FIGS. 1, 3, 5 and 6, the seat assembly 22 includes one or more seatback tethers 70a, 70b, 70c supported by the seatback 24 that may control kinematics of the airbags 26a, 26b in the inflated positions relative to the seatback 24. The seatback tethers 70a, 70b, 70c extend from first distal ends 72 to second distal ends 74. The first distal ends 72 are releasably fixed to the second distal ends 74. Releasably fixed means that the first distal ends 72 can be separated from fixation with the second distal end with the use of tools or the like. For example, the first distal ends 72 may be releasably fixed to the second distal ends 74 via snaps 75, Velcro, or other suitable structure. Releasing the first distal ends 72 from the second distal ends 74 may aid in egress of the occupant from the seat assembly 22 after airbags 26a, 26b are inflated and the bars 28a, 28b moved to the deployed positions. The seatback tethers 70a, 70b, 70c may form continuous closed loops when the first distal ends 72 are releasably fixed to the second distal ends 74.

The seatback tethers 70a, 70b, 70c are internal of the cover 38 of the seatback 24 with the airbags 26a, 26b in the uninflated positions and the bars 28a, 28b at the stowed positions. The first distal ends 72 and the second distal ends 74 of the seatback tethers 70a, 70b, 70c are supported at the top end 40 of the seatback 24 and releasably fixed to each other. The first distal ends 72 and the second distal ends 74 may be disposed above the headrest 48. The seatback tethers 70a, 70b, 70c extends downward from the first distal ends 72 and the second distal ends 74 through the sleeves 58, 60 along the first side 44 and the second side 46 and behind the seatback frame 36 of the seatback 24.

The seatback tethers 70a, 70b, 70c are external of the cover 38 of the seatback 24 with the airbags 26a, 26b in the inflated positions and the bars 28a, 28b at the deployed positions. The first distal ends 72 and the second distal ends 74 of the seatback tethers 70a, 70b, 70c are forward of the seatback 24 and releasably fixed to each other, e.g., at the distal edges of the airbags 26a, 26b. The seatback tethers 70a, 70b, 70c may extend from behind the seatback frame 36 to forward of the seatback 24. The seatback tethers 70a, 70b, 70c may surround the seatback frame 36 and the airbag 26a, 26b, e.g., extending through the longitudinal sleeves 58 of the airbags 26a, 26b. The seatback tethers 70a, 70b, 70c may be positioned relative to each other along the vertical axis A1. For example, a first seatback tether 70a may be above a second seatback tether 70b, and the second seatback tether 70b may be above a third seatback tether 70c.

The seat assembly 22 may include one or more seat bottom tethers 76a, 76b that may be fixed to and control kinematics of the airbags 26a, 26b in the inflated positions relative to the seat bottom 32. For example, a first seat bottom tether 76a may be fixed to and control kinematics of the first airbag 26a, and a second seat bottom tether 76b may be fixed to and control kinematics of the second airbag 26b. The seat bottom tethers 76a, 76b may be fixed to the airbags 26a, 26b. For example, distal ends 78 of the seat bottom tethers 76a, 76b may be fixed to the airbags 26a, 26b at the front distal edges 50a, 50b. The seat bottom tethers 76a, 76b may be fixed to the airbags 26a, 26b via stitching, adhesive, or any suitable structure. The seat bottom tethers 76a, 76b may be fixed to distal ends 80 of the bars 28a, 28b, e.g., at bottoms the main portions 66 of the bars 28a, 28b. The seat bottom tethers 76a, 76b may be fixed to the bars 28a, 28b with straps, stitching, or any suitable structure.

The seat bottom tethers 76a, 76b may be slidably engaged the with the seat bottom 32 and slidable from first positions (shown in FIG. 3) with the airbags 26a, 26b at the uninflated positions along the seat bottom 32 away from the seatback 24 to second positions (shown in FIG. 6) with the airbags 26a, 26b at the inflated positions. For example, ends 82 of the seat bottom tethers 76a, 76b opposite the distal ends 78 may be fixed to shuttles 84 that are slidable along the seat bottom 32 from the first position to the second position. For example, the shuttles 84 may slide along tracks 86 that are fixed to the seat bottom 32, the tracks 86 permitting movement of the shuttles 84 along a longitudinal axis A3 and inhibiting movement along the vertical axis A1 and the lateral axis A2. The tracks 86 may include, e.g., rails, channels, or any other suitable structure.

Figure 7:
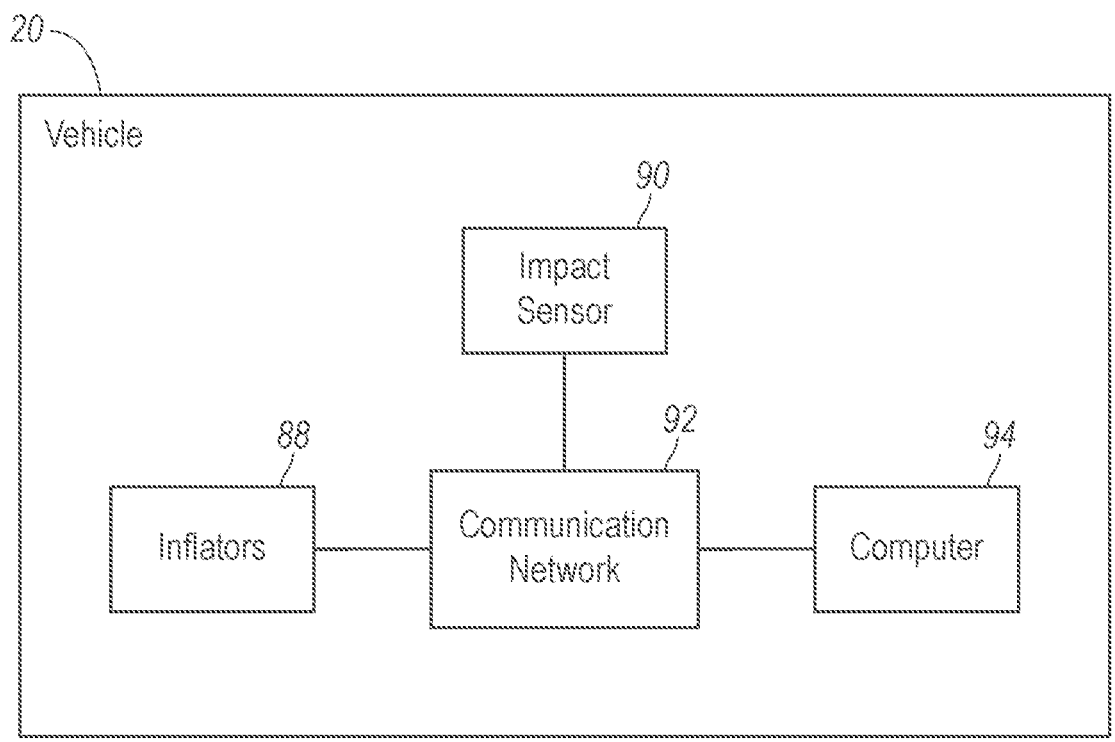
FIG. 7 is a block diagram of components of the vehicle.

With reference to FIG. 7, the seat assembly 22 may include one or more inflators 88 for inflating the airbags 26a, 26b to the inflated positions. The inflators 88 provide inflation medium IM to inflate the airbags 26a, 26b from uninflated positions to the inflated positions. Each inflator 88 may be, for example, a pyrotechnic inflator that uses a chemical reaction to drive inflation medium IM to the first airbag 26a and/or the second airbag 26b. The inflators 88 may be of any suitable type, for example, a cold-gas inflator. Each inflator 88 may be in fluid communication with one or more of the first airbag 26a and/or the second airbag 26b, e.g., directly, through various piping, etc. For example, one inflator 88 may provide inflation medium IM to the first airbag 26a and the second airbag 26b. As another example, one inflator 88 may provide inflation medium IM only to the first airbag 26a and another inflator 88 may provide inflation medium IM only to the second airbag 26b. The inflators 88 may provide inflation medium IM to the inflation tubes 52a, 52b, 52c of the airbags 26a, 26b. The inflators 88 may be supported by the airbag housings, the seatback frame 36, or by any other suitable structure of the seat assembly 22.

The vehicle 20 may include at least one impact sensor 90 for sensing certain impacts of the vehicle 20. The impact sensor 90 is configured to detect certain impacts to the vehicle 20. Alternatively or additionally to sensing certain impacts, the impact sensor 90 may be configured to sense certain impacts prior to impact, i.e., pre-impact sensing. The impact sensor 90 may be of any suitable type, for example, post contact sensors such as accelerometers, pressure sensors, and contact switches; and pre-impact sensors such as radar, LIDAR, and vision sensing systems. The vision systems may include one or more cameras, CCD image sensors, CMOS image sensors, etc. The impact sensor 90 may be located at numerous points in or on the vehicle 20.

The vehicle 20 may include a communication network 92. The communication network 92 includes hardware, such as a communication bus, for facilitating communication among vehicle 20 components, e.g., a computer 94, the impact sensor 90, the inflators 88, etc. The communication network 92 84 may facilitate wired or wireless communication among the vehicle 20 components in accordance with a number of communication protocols such as controller area network (CAN), Ethernet, WiFi, Local Interconnect Network (LIN), and/or other wired or wireless mechanisms.

The computer 94 may be a microprocessor-based computer implemented via circuits, chips, or other electronic components. For example, the computer 94 may include a processor, a memory, etc. The memory of the computer 94 may include memory for storing programming instructions executable by the processor as well as for electronically storing data and/or databases.

The computer 94 may be programmed to actuate one or more of the inflators 88, e.g., to provide an impulse to a pyrotechnic charge of one or more of the inflators 88. The computer 94 may actuate one or more of the inflators 88 in response to detecting certain vehicle impacts. For example, the computer 94 may actuate the one or more inflators 88 to inflate one or both of the airbags 26a, 26b upon detecting a certain vehicle impact based on information received from the impact sensor 90. The computer 94 may inflate one of the airbags 26a, 26b and not the other, e.g., just the first airbag 26a or just the second airbag 26b, based on a direction of the certain impact relative to the seat assembly 22 as detected by the impact sensors 90.

Figure 5:
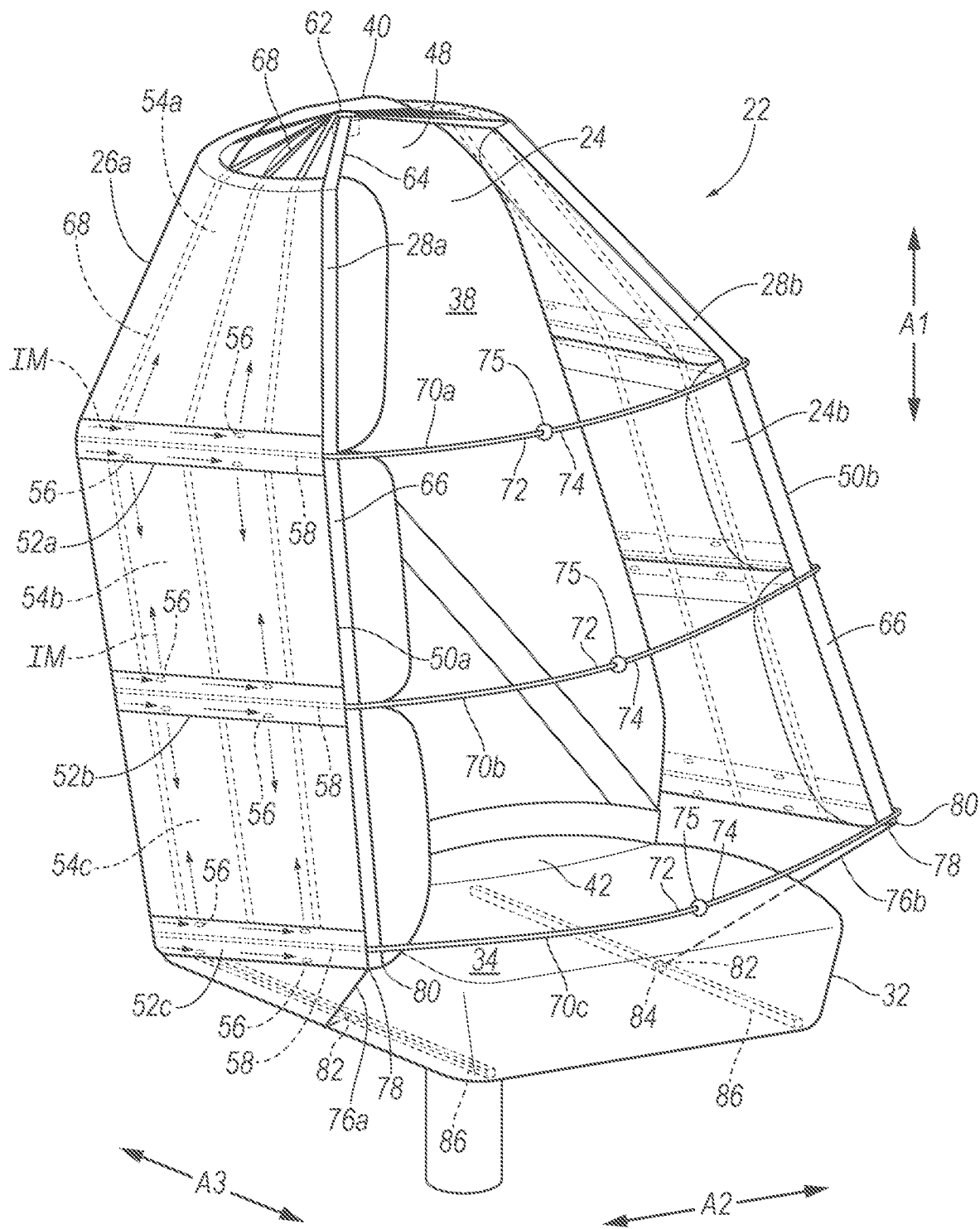
FIG. 5 is a front-side perspective diagrammatic view of the seat and the airbag assembly partially inflated to an inflated position.

The Inflation medium IM provided to the airbags 26a, 26b by the inflators 88 may first flow to the inflation tubes 52a, 52b, 52c. The inflation medium IM may inflate the inflation tubes 52a, 52b, 52c and move the bars 28a, 28b toward the deployed position, as shown in FIG. 5. Force from inflation of the inflation tubes 52a, 52b, 52c may tear the cover 38 of the seatback 24 along a tear seam or the like and permit movement of the bars 28a, 28b. Inflation of the inflation tubes 52a, 52b, 52c and movement of the bars 28a, 28b may urge the first distal ends 72 and the second distal ends 74 of the seatback tethers 70a, 70b, 70c from being at the top end 40 of the seatback 24 to forward of the seatback 24. The seatback tethers 70a, 70b, 70c may tear the vertical sleeves 58, 60 as they move from the top end 40 to forward of the seatback 24. Inflation of the inflation tubes 52a, 52b, 52c and movement of the bars 28a, 28b may urge the seat bottom tethers 76a, 76b and shuttles 84 connected thereto to from the first positions to the second positions. After the inflation tubes 52a, 52b, 52c are inflated (or at least partially inflated), inflation medium IM flows from the inflation tubes 52a, 52b, 52c to the inflation chambers 54a, 54b, 54c, 54d to inflate the inflation chambers 54a, 54b, 54c, 54d to the inflated positions. For example, inflation medium IM may flow upward and downward out of the openings 56 in the inflation tubes 52a, 52b, 52c to the adjacent inflation chambers 54a, 54b, 54c, 54d. The first distal ends 72 and the second distal ends 74 of the seatback tethers 70a, 70b, 70c may remain releasably fixed to each other throughout inflation of the airbags 26a, 26b. After the airbags 26a, 26b are inflated, the occupant, or other person, may release the first distal ends 72 and the second distal ends 74 from each other to aid in the occupant egressing from the seat assembly 22.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The adjectives first, second, etc., are used throughout this document as identifiers and, unless explicitly stated otherwise, are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A seat assembly, comprising:
   a seatback;
   an airbag supported by the seatback and inflatable from an uninflated position to an inflated position; and
   a bar pivotally supported by the seatback and fixed to the airbag, the bar pivotable about a vertical axis of the seat assembly from a stowed position at the seatback with the airbag at the uninflated position to a deployed position forward of the seatback with the airbag at the inflated position.

2. The seat assembly of claim 1, wherein the airbag in the inflated position includes a front distal edge and the bar at the deployed position is elongated along the front distal edge.

3. The seat assembly of claim 1, wherein the airbag in the inflated position includes an inflation tube that extends forward of the seat back toward the bar at the deployed position.

4. The seat assembly of claim 3, wherein the airbag in the inflated position includes a first inflation chamber above the inflation tube and a second inflation chamber below the inflation tube.

5. The seat assembly of claim 4, wherein the inflation tube is in fluid communication with the first inflation chamber and the second inflation chamber.

6. The seat assembly of claim 5, wherein the airbag in the inflated position includes a second inflation tube below the second inflation chamber and a third inflation chamber below the second inflation tube, the second inflation tube extending forward of the seat back toward the bar at the deployed position and in fluid communication with second inflation chamber and the third inflation chamber.

7. The seat assembly of claim 1, further comprising a seat bottom supporting the seat back and a tether fixed to the airbag, the tether slidably engaged with the seat bottom and slidable from a first position with the airbag at the uninflated position along the seat bottom away from the seat back to a second position with the airbag at the inflated position.

8. The seat assembly of claim 7, further comprising a shuttle fixed to the tether and supported by the seat bottom, the shuttle and the tether slidable along the seat bottom from the first position to the second position.

9. The seat assembly of claim 7, wherein the tether is fixed to a distal end of the bar.

10. The seat assembly of claim 7, wherein the seat bottom includes a top surface and the airbag in the inflated position extends below the top surface of the seat bottom.

11. The seat assembly of claim 1, further comprising a plurality of ribs elongated vertically along the airbag in the inflated position, the ribs spaced from each other, the seat back, and the bar at the deployed position.

12. The seat assembly of claim 11, wherein the ribs are stiffer than the airbag.

13. The seat assembly of claim 1, wherein the seatback includes a cover, and wherein the bar at the stowed position is internal of the cover and the bar at the deployed position is external of the cover.

14. The seat assembly of claim 1, wherein the airbag is supported at a first side of the seatback, and further comprising a second airbag supported by the seatback at a second side of the seatback laterally spaced from the first side, the second airbag inflatable from an uninflated position to an inflated position, and a second bar supported by the seatback and fixed to the second airbag, the second bar pivotable about the vertical axis from a stowed position at the seatback with the second airbag at the uninflated position to a deployed position forward of the seatback with the second airbag at the inflated position.

15. The seat assembly of claim 14, further comprising a tether that extends from a first distal end to a second distal end, the first distal end releasably fixed to the second distal end, the first distal end and the second distal end supported at a top of the seatback with the airbag in the uninflated position, the first distal end and the second distal end forward of the seatback with the airbag in the inflated position.

16. A seat assembly, comprising:
    a seatback;
    a first airbag supported by the seatback and inflatable from an uninflated position to an inflated position, the first airbag in the uninflated position at a first side of the seatback and in the inflated position extending forward of the seatback to a first distal edge of the first airbag;
    a second airbag supported by the seatback and inflatable from an uninflated position to an inflated position, the second airbag in the uninflated position at a second side of the seatback laterally spaced from the first side and in the inflated position forward of the seatback to a second distal edge of the second airbag; and
    a tether supported by the seatback, the tether extending from a first distal end of the tether to a second distal end of the tether, the first distal end releasably fixed to the second distal end, the first distal end and the second distal end supported at a top of the seatback with the first airbag and the second airbag in the uninflated positions, the first distal end and the second distal end forward of the seatback at the first distal edge and the second distal edge with the first airbag and the second airbag in the inflated positions.

17. The seat assembly of claim 16, wherein the seatback includes a seatback frame, and the tether extends from behind the seatback frame to forward of the seatback with the first airbag and the second airbag in the inflated positions.

18. The seat assembly of claim 17, further comprising a second tether supported by the seatback, the second tether extending from a first distal end of the second tether to a second distal end of the second tether, the first distal end of the second tether releasably fixed to the second distal end of the second tether and supported at the top of the seatback with the first airbag and the second airbag in the uninflated positions and forward of the seatback below the first distal end of the tether and the second distal end of the tether at the first distal edge and the second distal edge with the first airbag and the second airbag in the inflated positions.

19. The seat assembly of claim 16, further comprising a bar supported by the seatback and fixed to the first airbag, the bar pivotable about a vertical axis of the seat assembly from a stowed position at the seatback with the first airbag at the uninflated position to a deployed position forward of the seatback with the first airbag at the inflated position.

20. The seat assembly of claim 16, further comprising a seat bottom supporting the seat back and a second tether fixed to the first airbag, the second tether slidably engaged with the seat bottom and slidable from a first position with the first airbag at the uninflated position along the seat bottom away from the seat back to a second position with the second airbag at the inflated position.

\* \* \* \* \*